(12) United States Patent
Kgami et al.

(10) Patent No.: US 6,324,140 B1
(45) Date of Patent: Nov. 27, 2001

(54) ECCENTRIC DISK DETECTION APPARATUS FOR AN OPTICAL DISK DEVICE

(75) Inventors: Shin Kgami, Sendai; Yuichiro Tomishima, Tomiya, both of (JP)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/301,941

(22) Filed: Apr. 29, 1999

(30) Foreign Application Priority Data

May 15, 1998 (JP) .................................................. 10-132839

(51) Int. Cl.[7] ...................................................... G11B 5/09
(52) U.S. Cl. ...................................... 369/53.18; 369/53.14
(58) Field of Search .................................. 369/47, 48, 50, 369/54, 58, 53.14, 53.18, 53.32, 53.42, 53.43, 53.3, 47.44

(56) References Cited

U.S. PATENT DOCUMENTS

| | | | |
|---|---|---|---|
| 5,701,284 | * 12/1997 | Lee | 369/50 |
| 5,886,966 | * 3/1999 | Ota et al. | 369/54 |
| 5,963,517 | * 10/1999 | Nakagaki et al. | 369/4 |
| 6,097,680 | * 8/2000 | Yen et al. | 369/50 |
| 6,111,826 | * 8/2000 | Minase | 369/50 |

* cited by examiner

Primary Examiner—Thang V. Tran
(74) Attorney, Agent, or Firm—Dilworth & Barrese, LLP

(57) ABSTRACT

An eccentric disk detection apparatus for an optical disk device is provided. The eccentric disk detection apparatus detects eccentricity, as well as determines whether the eccentricity is high or low, by sensing and analyzing the reverse electromotive force. Upon detection of eccentricity, the eccentric disk detection apparatus can adjust the maximum number of revolutions of the disk in accordance to the sensed reverse electromotive force, thereby compensating for the eccentricity of the disk.

19 Claims, 4 Drawing Sheets

ECCENTRIC DISK DETECTION APPARATUS FOR AN OPTICAL DISK DEVICE

BACKGROUND

1. Field of the Invention

The present invention relates to an optical disk device, and in particular to an eccentric disk detection apparatus for detecting eccentricity of an optical disk inserted within an optical disk device and controlling revolution of the disk accordingly.

2. Description of the Related Art

The development of high performance personal computers has led to optical disk devices which provide high-speed disk revolution to an optical disk, such as a CD-ROM (Compact Disk-Read Only Memory), CD-R (CD-Recordable), CD-RW (CD-ReWritable), and DVD-RAM (Digital Video Disk-Random Access Memory), inserted within the optical disk device. High-speed disk revolution can cause an eccentric disk, e.g., a disk which is not precisely flat or round, etc., to vibrate. The vibration can adversely affect the personal computer, including the optical disk device, by creating unnecessary noise, by causing failure in the reproduction of the data stored within the optical disk, or by causing failure in writing data to the optical disk.

To prevent the eccentric disk from vibrating, methods have been suggested in order to counteract the eccentricity of the disk. In one method, an automatic balancing device having a circular guide and a sphere rotating over the guide is provided to a spindle motor. During the rotation of the spindle motor, the sphere is automatically positioned in a location where eccentricity is compensated for. Another method calls for the use of an acceleration sensor during revolution of the eccentric disk to detect vibrations.

An unreliable compensation for eccentricity is typically made by using the automatic balancing device due to the slide friction between the sphere and the slide. Further, a non-eccentric disk could be made eccentric by the rotating sphere. Further still, the requirement for a highly precise guide and sphere mechanism can increase the cost of the automatic balancing device. The method utilizing the acceleration sensor also leads to an increase in cost.

A need therefore exists for an eccentric disk detection apparatus for an optical disk device which provides a reliable compensation for eccentricity, protects non-eccentric disks, provides high performance, and is inexpensive.

SUMMARY

An eccentric disk detection apparatus for an optical disk device is provided. The optical disk device includes a pickup mounted to a base for reading or writing data stored within or to the disk. The base includes a disk rotating device, such as a spindle motor, for mounting the disk thereon and for rotating the same. The base is elastically supported by rubber members which are vibrated due to the eccentricity of the disk during revolution of the disk. The eccentric disk detection apparatus detects the vibrations by sensing a reverse electromotive force generated by a pickup actuator coil in proximity to the pickup.

The pickup has a lens driver supported by a spring formed of wire. A magnetic circuit including a coil for focus control, a yoke, and a magnet in the lens driver experience a relative vibration during operation, thereby generating the reverse electromotive force in proportion to a rotational speed in the coil. The pickup actuator coil also generates or senses the reverse electromotive force and eccentricity can be detected by the eccentric disk detection apparatus, as well as whether the eccentricity is high or low.

A pickup driver and an amplifier are connected in parallel to both ends of the pickup actuator coil. And analog-to-digital (A/D) converter converts the output of the amplifier to a digital signal. A central processing unit (CPU) controls the number of revolutions of the spindle motor according to a reverse electromotive force represented by the digital signal received from the A/D converter. The CPU detects the amplitude of the digital signal representing the reverse electromotive force. If the obtained amplitude value exceeds a predetermined reference value, the CPU determines the disk to be highly eccentric.

Upon detection of eccentricity, the eccentric disk detection apparatus can adjust or decrease the maximum number of revolutions of the disk in accordance to the sensed reverse electromotive force, thereby compensating for the eccentricity of the disk. That is, by decreasing the number of disk revolutions in accordance to the eccentricity of the disk, the vibrations can be reduced. Also, upon sensing the reverse electromotive force, the pickup actuator coil temporarily stops to differentiate the reverse electromotive force from a driving signal flowing through the coil. It is preferred for the disk to revolve at a constant velocity during the sensing of the reverse electromotive force to increase sensing accuracy.

The resilient supporting members of the base can be influenced by temperature. Consequently, the vibrations transferred to the pickup can be altered according to the temperature within the disk device and not because of the disk's eccentricity. Thus, the sensed reverse electromotive force can be changed to appropriately correspond to a temperature reading measured by a temperature sensor. It is noted that detection of eccentricity can be omitted to reduce operation time for low-speed disks, such as an audio disk, since these disks do not require control of their revolution based on their eccentricity.

DETAILED DESCRIPTION OF PREFERRED EMBODIMENTS

Figure 1:
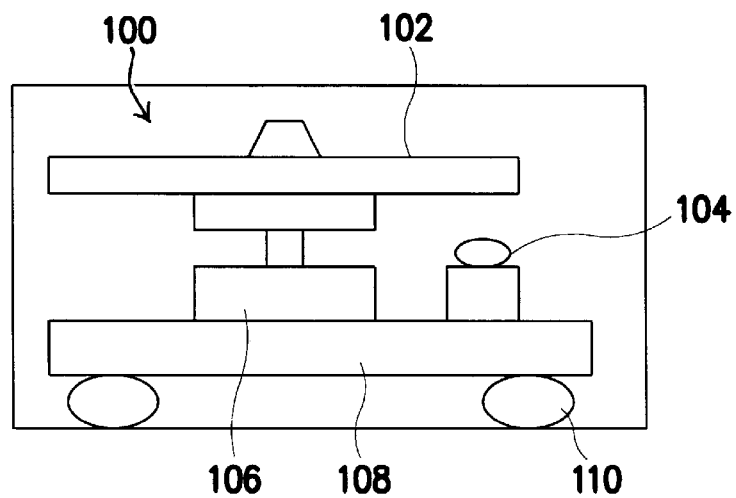
FIG. 1 is a block diagram of an optical disk device.

It is to be understood that in the following description of a preferred embodiment, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

With reference to FIG. 1, a block diagram of an optical disk device is shown designated generally by reference numeral 100. The optical disk device 100 includes a spindle motor 106 mounted on a base 108 for rotating a disk 102 inserted within the disk device. As shown by FIG. 1, the disk 102 is rotatably mounted on a turntable of the spindle motor 106 after being inserted within the disk device. A pickup 104 is mounted to the base 108 for reading/writing data from and to disk 102 under a servo control. The base 108 is elastically supported by resilient members 110 which are manufactured from rubber or a rubber-like material.

Figure 2:
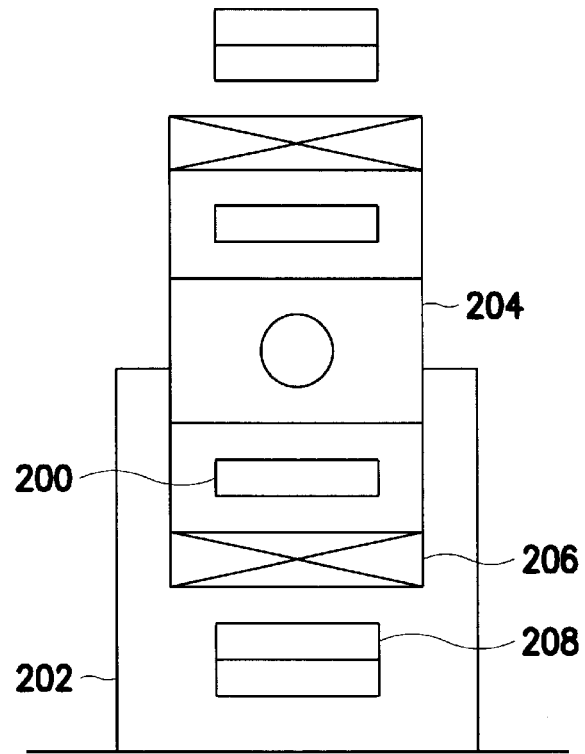
FIG. 2 is a block diagram of a pickup actuator of the optical disk device of FIG. 1.

FIG. 2 is a block diagram of the pickup actuator shown in FIG. 1. A pickup lens driver 204 is capable of moving horizontally and vertically by a spring 202 formed preferably of wire. The pickup lens driver 204 includes a coil 206 having a yoke 200 in the inside and a magnet 208 fixed on a fixing portion on the outside. As a result, the lens driver 204 moves horizontally and vertically by applying a driving signal to the coil 206.

Figure 3:
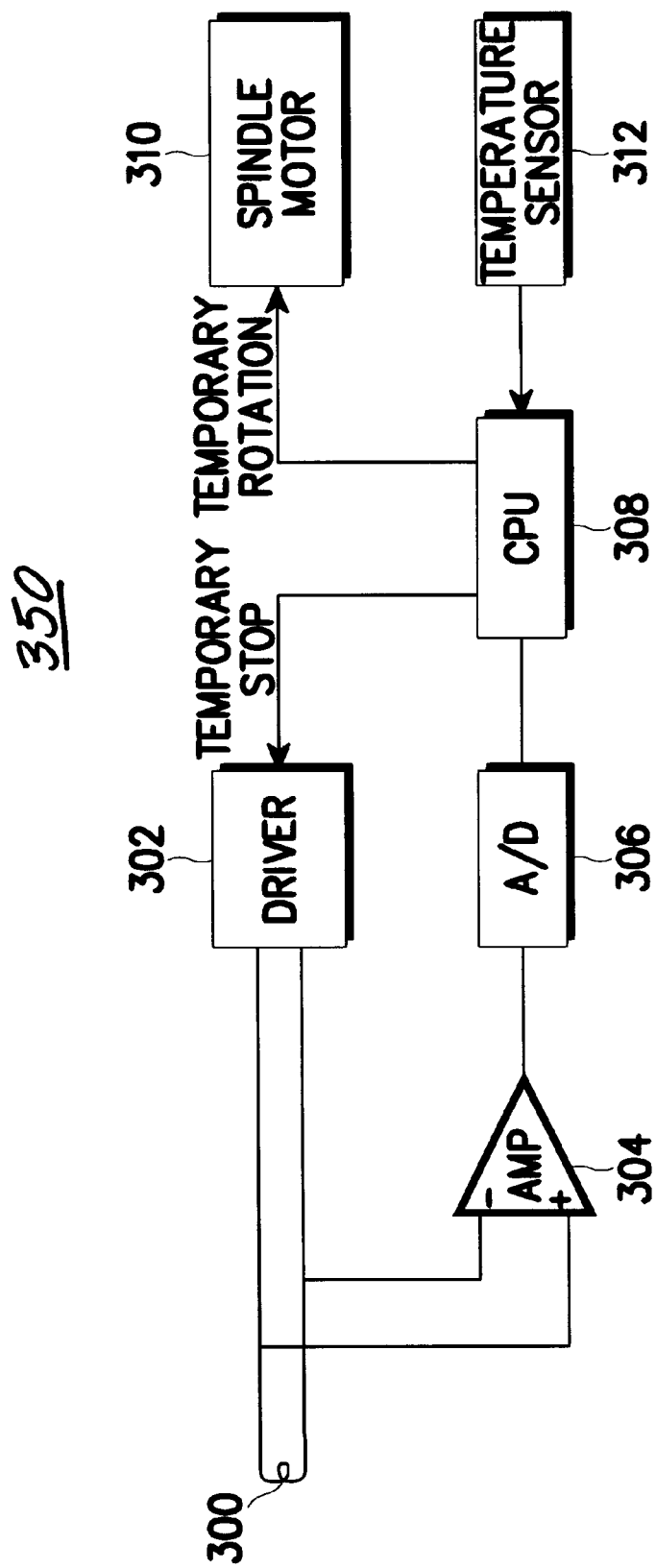
FIG. 3 is a schematic block diagram of the eccentric disk detection apparatus in accordance with the present invention.

With reference to FIG. 3, there is shown a schematic diagram of the eccentric disk detection apparatus for an optical disk device designated generally by reference numeral 350. The eccentric disk detection apparatus 350 uses the pickup 104 of the optical disk device 100 for an eccentricity processing operation.

A pickup driver 302 and an amplifier 304 are connected in parallel to both ends of a pickup actuator coil 300 in proximity to the pickup 104. And analog-to-digital (A/D) converter 306 converts the output of the amplifier 304 to a digital signal. A central processing unit (CPU) 308 controls the number of revolutions of the spindle motor 106 according to a reverse electromotive force represented by the digital signal received from the A/D converter 306.

Figure 4A:
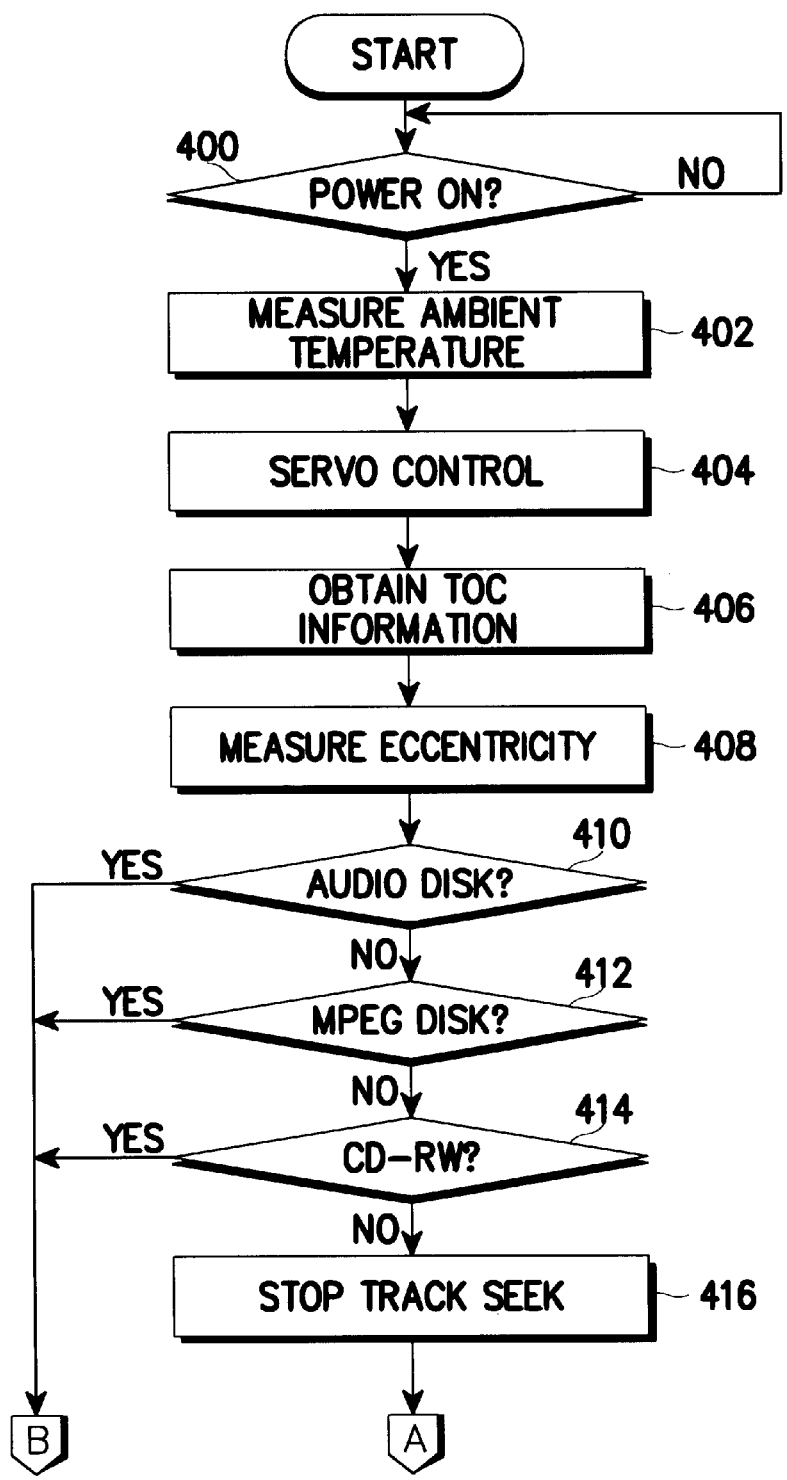
FIGS. 4A and 4B are flowcharts illustrating a method of operation of the eccentric disk detection apparatus of FIG. 3.
Figure 4B:
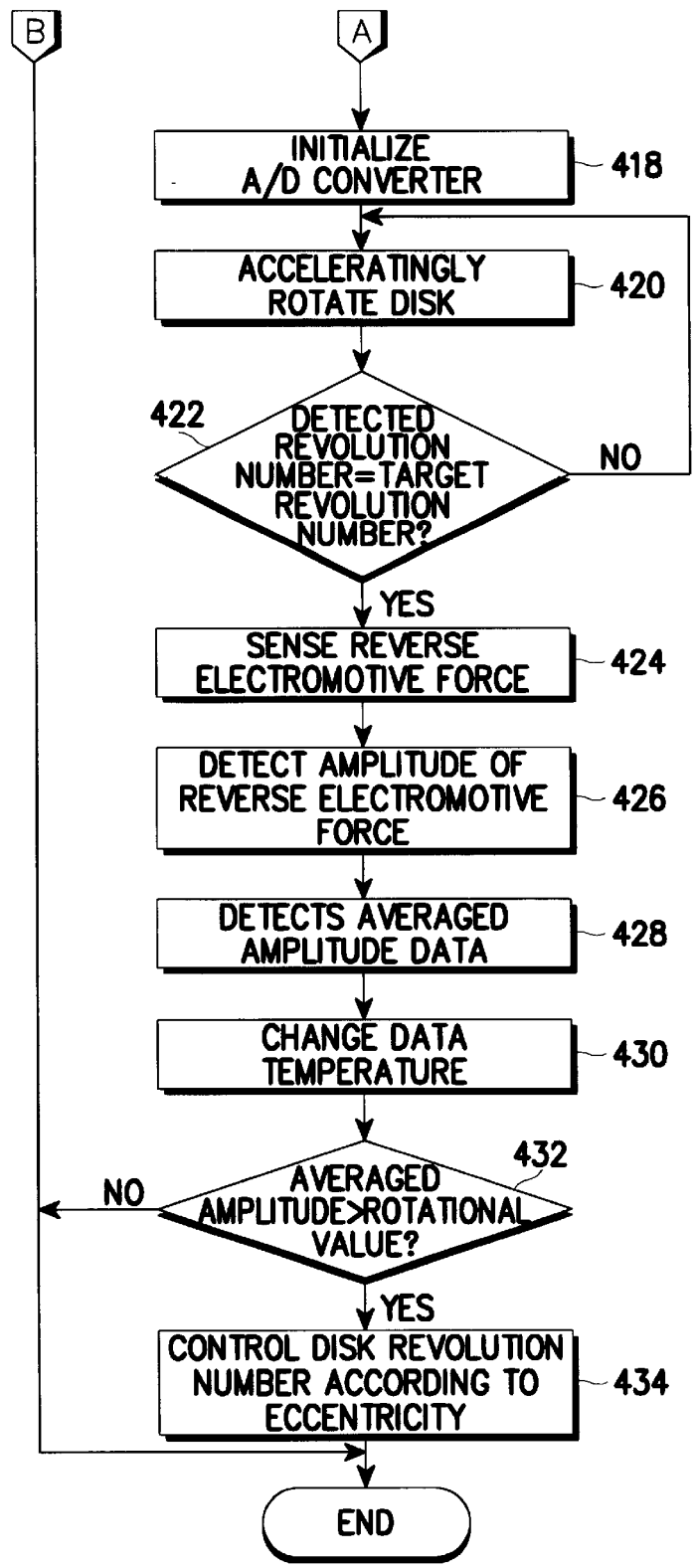

This control operation for compensating due to the eccentricity of the disk 102 is illustrated by the flowcharts of FIGS. 4A and 4B. In step 400, it is determined if the power is on. If the power is on, in step 402, the CPU 308 measures the ambient temperature by a temperature sensor 312. In step 404, the CPU 308 starts servo control. First, the CPU 308 obtains TOC (Table Of Content) information in step 406, and second, the CPU 308 measures disk eccentricity in step 408.

In steps 410, 412, and 414, i.e., prior to detection of eccentricity, the CPU 308 determines whether the current disk is an audio disk, an MPEG (Moving Picture Expert Group) disk, or an CD-RW. The eccentricity detecting step can be omitted for these disks to reduce operation time, because these are low-speed disks and therefore, do not require any revolution control due to any disk eccentricity. If the disk is not one of these type of disks, the CPU 308, upon receiving the digital signal from the A/D converter, sends a stop command to the pickup driver 302 in step 416. The stop command temporarily stops transmission of a driving signal to the pickup actuator coil 300 to differentiate the reverse electromotive force from the driving signal flowing through the coil 206. Thus, track seeking is stopped.

In step 418, the CPU 308 initializes the A/D converter 306 and, in step 420, accelerates rotation of the disk up to a target revolution number (constant velocity) for detecting eccentricity. In step 422, the CPU 308 detects the disk revolution number and determines whether the detected revolution number equals the target revolution number. If it does, the CPU 308 senses the reverse electromotive force generated at both ends of the pickup actuator coil 300 by the A/D converter 306 in step 424. The amplifier 304 being a differential amplifying circuit amplifies the reverse electromotive force of the coil 300 and the A/D converter 306 converts the amplified signal to a digital signal.

In steps 426 and 428, the CPU 308 detects the amplitude of the digital signal representing the reverse electromotive force and obtains averaging data. In step 430, the CPU 308 changes a temperature with respect to the obtained data according to the previously measured ambient temperature. If the obtained amplitude value exceeds a predetermined reference value, the CPU 308 determines the disk to be highly eccentric in step 432, and reduces the disk revolution number below a predetermined value by referring to a look-up table. Accordingly, rotation vibration is suppressed in step 434.

In a preferred embodiment, the following look-up rpm (revolutions per minute) table (Table 1) is accessed by the CPU 308 for setting a proper maximum (MAX) revolution per minute for a given disk according to the data resulting from the data temperature change.

TABLE 1

CPU Look-up Table For Setting A Proper Revolution For An Eccentric Disk

| MAX 7000 rpm | MAX 6000 rpm | MAX 5000 rpm | MAX 4000 rpm | MAX 3000 rpm | MAX 2000 rpm |
| --- | --- | --- | --- | --- | --- |

High-speed revolution at MAX 7000 rpm, for example, is set for a disk of low eccentricity, and low-speed revolution at MAX 2000 rpm, for example, is set for a disk of high eccentricity.

As describe above, there is no need for any additional device in operating the eccentric disk detection apparatus of the present invention which uses the optical pickup actuator. The eccentric disk detection apparatus achieves high and reliable performance while having a simple and inexpensive structure. Further, the present invention provides accurate detection of a disk's eccentricity by measuring the amplitude of the sensed reverse electromotive force.

Although an illustrative embodiment of the present invention has been described herein with reference to the accompanying drawings, it is to be understood that the invention is not limited to that precise embodiment, and that various other changes and modifications may be affected therein by one skilled in the art without departing from the scope or spirit of the invention. All such changes and modifications are intended to be included within the scope of the invention as defined by the appended claims.

What is claimed is:

1. An eccentric disk detection apparatus for an optical disk device of the type having means for rotating a disk loaded within the optical disk device at a predetermined rotational speed, and a pickup for reading and writing data from and to said disk, said eccentric disk detection apparatus comprising:

means for generating a reverse electromotive force in proportion to the rotational speed of said rotating means when vibration occurs during rotation of said disk and transmitting a reverse electromotive force signal indicative of the reverse electromotive force generated; and control means for detecting disk eccentricity, based on the type of disk inserted within the optical disk device and contents recorded on the disk and for controlling the rotational speed of the rotating means in response to a received reverse electromotive force signal.

2. The eccentric disk detection apparatus according to claim 1, further comprising:

an amplifier for amplifying the reverse electromotive force signal generated by the means for generating; and an analog-to-digital converter for converting the amplified analog reverse electromotive force signal to a digital signal, said digital signal being transmitted to the control means.

3. The eccentric disk detection apparatus according to claim 1, wherein the means for rotating includes a spindle motor.

4. The eccentric disk detection apparatus according to claim 2, wherein the control means determines the eccentricity of said disk upon receiving the digital signal transmitted by the analog-to-digital converter by detecting the amplitude of the digital signal and determining whether the amplitude is greater than a predetermined value.

5. The eccentric disk detection apparatus according to claim 4, wherein the control means adjusts the revolutions per minute of the disk after determining that the amplitude of the digital signal is greater than the predetermined value by controlling the rotational speed of the rotating means to compensate for the disk's eccentricity.

6. The eccentric disk detection apparatus according to claim 4, wherein the control means upon receiving the digital signal transmitted by the analog-to-digital converter transmits at least one signal to a pickup driver, said pickup driver upon receiving said at least one signal transmits at least one control signal to the means for generating to temporarily stop the means for generating.

7. The eccentric disk detection apparatus of claim 1, wherein the control means rotates the disk at a constant velocity by controlling the means for rotating upon receiving the reverse electromotive force signal transmitted by the means for generating.

8. The eccentric disk detection apparatus of claim 1, wherein the control means is a central processing unit.

9. The eccentric disk detection apparatus of claim 1, wherein the control means changes the reverse electromotive force generated by the means for generating in response to the reverse electromotive force signal based on a temperature reading measured by a temperature sensor electrically coupled to the control means.

10. The eccentric disk detection apparatus of claim 1, wherein the means for rotating is mounted on a base elastically supported by at least one resilient member.

11. The eccentric disk detection apparatus of claim 1, wherein the pickup includes a pickup lens driver capable of moving horizontally and vertically by a spring, the pickup lens driver includes a coil having a yoke positioned in the inside of the pickup lens driver and a magnet fixed on the outside of the pickup lens driver, the pickup lens driver moves horizontally and vertically by applying a driving signal to the coil.

12. The eccentric disk detection apparatus of claim 11, wherein the means for generating includes a pickup actuator coil positioned in proximity to the pickup lens driver, said pickup actuator coil being parallel to a pickup driver and an amplifier.

13. An eccentric disk detection apparatus for an optical disk device of the type having a motor for rotating a disk loaded within the optical disk device at a predetermined rotational speed, and a pickup for reading and writing data from and to said disk, said eccentric disk detection apparatus comprising:

an actuator coil in proximity to said pickup for generating a reverse electromotive force in proportion to the rotational speed of said motor when vibration occurs during rotation of said disk and transmitting a reverse electromotive force signal indicative of the reverse electromotive force generated;

a pickup driver for transmitting at least one control signal to said actuator coil for driving said actuator coil; and a processor for detecting disk eccentricity, based on the type of disk inserted within the optical disk device and contents recorded on the disk, for receiving the reverse electromotive force signal and for controlling the rotational speed of the motor accordingly.

14. The eccentric disk detection apparatus of claim 13, wherein the processor changes the reverse electromotive force generated by the actuator coil in response to the reverse electromotive force signal based on a temperature reading measured by a temperature sensor electrically coupled to the processor.

15. The eccentric disk detection apparatus according to claim 13, further comprising:

an amplifier for amplifying the reverse electromotive force signal generated by the actuator coil; and an analog-to-digital converter for converting the amplified analog reverse electromotive force signal to a digital signal, said digital signal being transmitted to the processor.

16. The eccentric disk detection apparatus according to claim 15, wherein the processor determines the eccentricity of said disk upon receiving the digital signal transmitted by the analog-to-digital converter by detecting the amplitude of the digital signal and determining whether the amplitude is greater than a predetermined value.

17. The eccentric disk detection apparatus according to claim 15, wherein the processor adjusts the revolutions per minute of the disk after determining that the amplitude of the digital signal is greater than the predetermined value by controlling the rotational speed of the rotating means to compensate for the disk's eccentricity.

18. The eccentric disk detection apparatus according to claim 15, wherein the processor transmits at least one signal to the pickup driver to temporarily stop the pickup driver upon the processor receiving the digital signal transmitted by the analog-to-digital converter.

19. The eccentric disk detection apparatus of claim 13, wherein the processor rotates the disk at a constant velocity by controlling the motor upon receiving the reverse electromotive force signal transmitted by the actuator coil.

* * * * *